(12) United States Patent  
Xia et al.

(10) Patent No.: US 12,634,181 B2  
(45) Date of Patent: May 19, 2026

---

(54) CYCLIC SHIFT BASED MAPPING SCHEMES FOR UPLINK CONTROL TRANSMISSIONS

(71) Applicant: ZTE Corporation, Shenzhen (CN)

(72) Inventors: Shuqiang Xia, Shenzhen (CN); Chunli Liang, Shenzhen (CN); Peng Hao, Shenzhen (CN); Xianghui Han, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 449 days.

(21) Appl. No.: 18/150,434

(22) Filed: Jan. 5, 2023

(65) Prior Publication Data

US 2023/0146287 A1 May 11, 2023

Related U.S. Application Data

(63) Continuation of application No. PCT/CN2020/100613, filed on Jul. 7, 2020.

(51) Int. Cl.
*H04L 27/26* (2006.01)
*H04W 72/21* (2023.01)

(52) U.S. Cl.
CPC ......... *H04L 27/2605* (2013.01); *H04W 72/21* (2023.01)

(58) Field of Classification Search
CPC ......... H04W 27/2605; H04W 27/2636; H04W 72/21; H04W 13/00744; H04L 5/0016; Y02D 30/70

(Continued)

(56) References Cited

U.S. PATENT DOCUMENTS 8,437,416 B2 * 5/2013 Tiirola ................ H04J 13/0062
                                               375/138
9,025,560 B2 * 5/2015 Han .................... H04L 27/2633
                                               370/208
(Continued)

FOREIGN PATENT DOCUMENTS

CN        101330306 A      12/2008
CN        110351017 A      10/2019
(Continued)

OTHER PUBLICATIONS

Cascudo, Ignacio. "On squares of cyclic codes." IEEE Transactions on Information Theory 65.2 (2018): 1034-1047. (Year: 2018).*
(Continued)

*Primary Examiner* — Christopher M Crutchfield
*Assistant Examiner* — Syed Ahmed
(74) *Attorney, Agent, or Firm* — Perkins Coie

(57) ABSTRACT

Methods, systems, and devices for mapping schemes for cyclic shift based uplink control transmissions in mobile communication technology are described. An exemplary method for wireless communication includes transmitting, by a wireless device over a control channel, an M-bit payload using N symbols, wherein M and N are positive integers, wherein each of the N symbols is represented using a base sequence $(u(n, m))$ and a cyclic shift $(n_{cs}(n, m))$ of the base sequence, wherein $n=0, 1, \ldots (N-1)$ indexes a symbol in the N symbols, wherein $m=0, 1, \ldots (2^M-1)$ indexes a combination set, wherein m and n are non-negative integers, wherein the cyclic shift for a j-th symbol is based on a cyclic shift for a (j-1)-th symbol, and wherein $j=1, 2, \ldots (N-1)$ is a positive integer.

20 Claims, 5 Drawing Sheets

(58) Field of Classification Search
USPC ......................................................... 370/329
See application file for complete search history.

(56) References Cited

U.S. PATENT DOCUMENTS

| | | | | |
|---|---|---|---|---|
| 9,578,637 | B2 * | 2/2017 | Noh .................... | H04L 27/2637 |
| 10,277,369 | B2 * | 4/2019 | Atungsiri ............ | H04L 27/2666 |
| 10,389,468 | B2 * | 8/2019 | Qu ...................... | H04J 13/0059 |
| 10,715,299 | B2 * | 7/2020 | Han ...................... | H04W 72/20 |
| 10,855,408 | B2 * | 12/2020 | Kwak ...................... | H04L 27/26 |
| 11,284,440 | B2 * | 3/2022 | Qian ................. | H04W 74/0833 |
| 11,463,956 | B2 * | 10/2022 | Liu ...................... | H04W 52/028 |
| 2012/0320880 | A1 * | 12/2012 | Han ...................... | H04L 5/0057 |
| | | | | 370/335 |
| 2013/0022017 | A1 * | 1/2013 | Han ...................... | H04L 5/0023 |
| | | | | 370/329 |
| 2017/0366377 | A1 | 12/2017 | Papasakellariou | |
| 2020/0236670 | A1 | 7/2020 | Xiong et al. | |
| 2023/0179993 | A1 * | 6/2023 | Ekpenyong ........... | H04W 8/245 |
| | | | | 370/328 |

FOREIGN PATENT DOCUMENTS

| | | | | | |
|---|---|---|---|---|---|
| EP | 2787674 | A1 | 10/2014 | | |
| JP | 2019-528609 | A | 10/2019 | | |
| JP | 2020-504955 | A | 2/2020 | | |
| KR | 20200027043 | A | 3/2020 | | |
| WO | WO-2014110894 | A1 * | 7/2014 | ........... | H04L 5/0048 |
| WO | 2018028273 | A1 | 2/2018 | | |
| WO | WO-2018082639 | A1 * | 5/2018 | ........ | H04W 74/0833 |
| WO | 2018128870 | A2 | 7/2018 | | |
| WO | 2019027995 | A1 | 2/2019 | | |
| WO | 2019192355 | A1 | 10/2019 | | |
| WO | 2019214331 | A1 | 11/2019 | | |
| WO | 2020091906 | A1 | 5/2020 | | |

OTHER PUBLICATIONS

ETSI TS 138 211 V15.3.0 (Oct. 2018), Physical channels and modulation (3GPP TS 38.211 version 15.3.0 Release 15) (Year: 2018).*

Office Action for Japanese Patent Application No. 2023-500323, mailed Feb. 29, 2024, with English summary (9 pages).

Oppo, "UL signals and channels for NR-U," 3GPP TSG RAN WG1 #98bis, R1-1910789, Chongqing, China, Oct. 14-20, 2019 (6 pages).

LG Electronics, "Text proposals for short PUCCH structure," 3GPP TSG RAN WG1 Meeting AH 1801, R1-1800375, Vancouver, Canada, Jan. 22-26, 2018 (8 pages).

International Search Report and Written Opinion for International Application No. PCT/CN2020/100613, mailed on Apr. 1, 2021 (10 pages).

Extended Search Report for European Patent Application No. 20944062.7, mailed Jul. 19, 2023 (9 pages).

Intel Corporation, "Cyclic shift hopping for PUCCH format 0," 3GPP TSG RAN WG1 Meeting AH 1801, R1-1800327, Vancouver, Canada, Jan. 22-26, 2018 (3 pages).

Vivo, "Discussion on physical UL channel design in unlicensed spectrum," 3GPP TSG RAN WG1 #99, R1-1912011, Reno, USA, Nov. 18-22, 2019 (11 pages).

Ericsson, "Feature lead summary for UL Signals and Channels," 3GPP TSG-RAN WG1 Meeting #98b, R1-1911484, Chongqing, China, Aug. 14-20, 2019 (27 pages).

Office Action for Chinese Patent Application No. 202080102810.1, mailed Nov. 14, 2024 (26 pages).

Communication under Rule 71(3) EPC Intention to Grant for European Patent Application No. 20944062.7, mailed Jan. 7, 2025 (9 pages).

KIPO, Office Action for Korean Application No. 10-2023-7000096, mailed on Mar. 26, 2025, 6 pages with unofficial English translation.

MOIP, Notice of Allowance for Korean Application No. 10-2023-7000096, mailed on Dec. 23, 2025, 8 pages with unofficial English translation.

* cited by examiner

300

310

Transmitting, by a wireless device over a control channel, an M-bit payload using N symbols

400

410 Receiving, by a network node from a wireless device over a control channel, an M-bit payload on N symbols 420 Transmitting, subsequent to the receiving, one or more subsequent communications to the wireless device over a data channel

CYCLIC SHIFT BASED MAPPING SCHEMES FOR UPLINK CONTROL TRANSMISSIONS

CROSS REFERENCE TO RELATED APPLICATIONS

This patent document is a continuation of and claims benefit of priority to International Patent Application No. PCT/CN2020/100613, filed on Jul. 7, 2020. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for different code rates and differently sized payloads, thereby improving coverage enhancements.

SUMMARY

This document relates to methods, systems, and devices for cyclic shift based mapping schemes for uplink control transmissions in mobile communication technology, including 5th Generation (5G) and New Radio (NR) communication systems.

In one exemplary aspect, a wireless communication method is disclosed. The method includes transmitting, by a wireless device over a control channel, an M-bit payload using N symbols, wherein M and N are positive integers, wherein each of the N symbols is represented using a base sequence (u(n, m)) and a cyclic shift ($n_{cs}(n, m)$) of the base sequence, wherein n=0, 1, . . . (N–1) indexes a symbol in the N symbols, wherein m=0, 1, . . . ($2^M$–1) indexes a combination set, wherein m and n are non-negative integers, wherein the cyclic shift for a j-th symbol is based on a cyclic shift for a (j–1)-th symbol, and wherein j=1, 2, . . . (N–1) is a positive integer.

In another exemplary aspect, a wireless communication method is disclosed. The method includes receiving, by a network node from a wireless device over a control channel, an M-bit payload on N symbols, wherein M and N are positive integers, and transmitting, subsequent to the receiving, one or more subsequent communications to the wireless device over a data channel, wherein each of the N symbols is represented using a base sequence (u(n, m)) and a cyclic shift ($n_{cs}(n, m)$) of the base sequence, wherein n=0, 1, . . . (N–1) indexes a symbol in the N symbols, wherein m=0, 1, . . . ($2^M$–1) indexes a combination set, wherein m and n are non-negative integers, wherein the cyclic shift for a j-th symbol is based on a cyclic shift for a (j–1)-th symbol, and wherein j=1, 2, . . . (N–1) is a positive integer.

In yet another exemplary aspect, a wireless communication method is disclosed. The method includes transmitting, by a wireless device over a control channel, an M-bit payload using N symbols, wherein M and N are positive integers, wherein each of the N symbols is represented using a base sequence (u(n, m)) and a cyclic shift ($n_{cs}(n, m)$) of the base sequence, wherein n=0, 1, . . . (N–1) indexes a symbol in the N symbols, wherein m=0, 1, . . . ($2^M$–1) indexes a combination set, wherein m and n are non-negative integers, and wherein the cyclic shift for each of the N symbols is based on one or more pseudo-random binary sequences.

In yet another exemplary aspect, a wireless communication method is disclosed. The method includes receiving, by a network node from a wireless device over a control channel, an M-bit payload on N symbols, wherein M and N are positive integers, and transmitting, subsequent to the receiving, one or more subsequent communications to the wireless device over a data channel, wherein each of the N symbols is represented using a base sequence (u(n, m)) and a cyclic shift ($n_{cs}(n, m)$) of the base sequence, wherein n=0, 1, . . . (N–1) indexes a symbol in the N symbols, wherein m=0, 1, . . . ($2^M$–1) indexes a combination set, wherein m and n are non-negative integers, and wherein the cyclic shift for each of the N symbols is based on one or more pseudorandom binary sequences.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
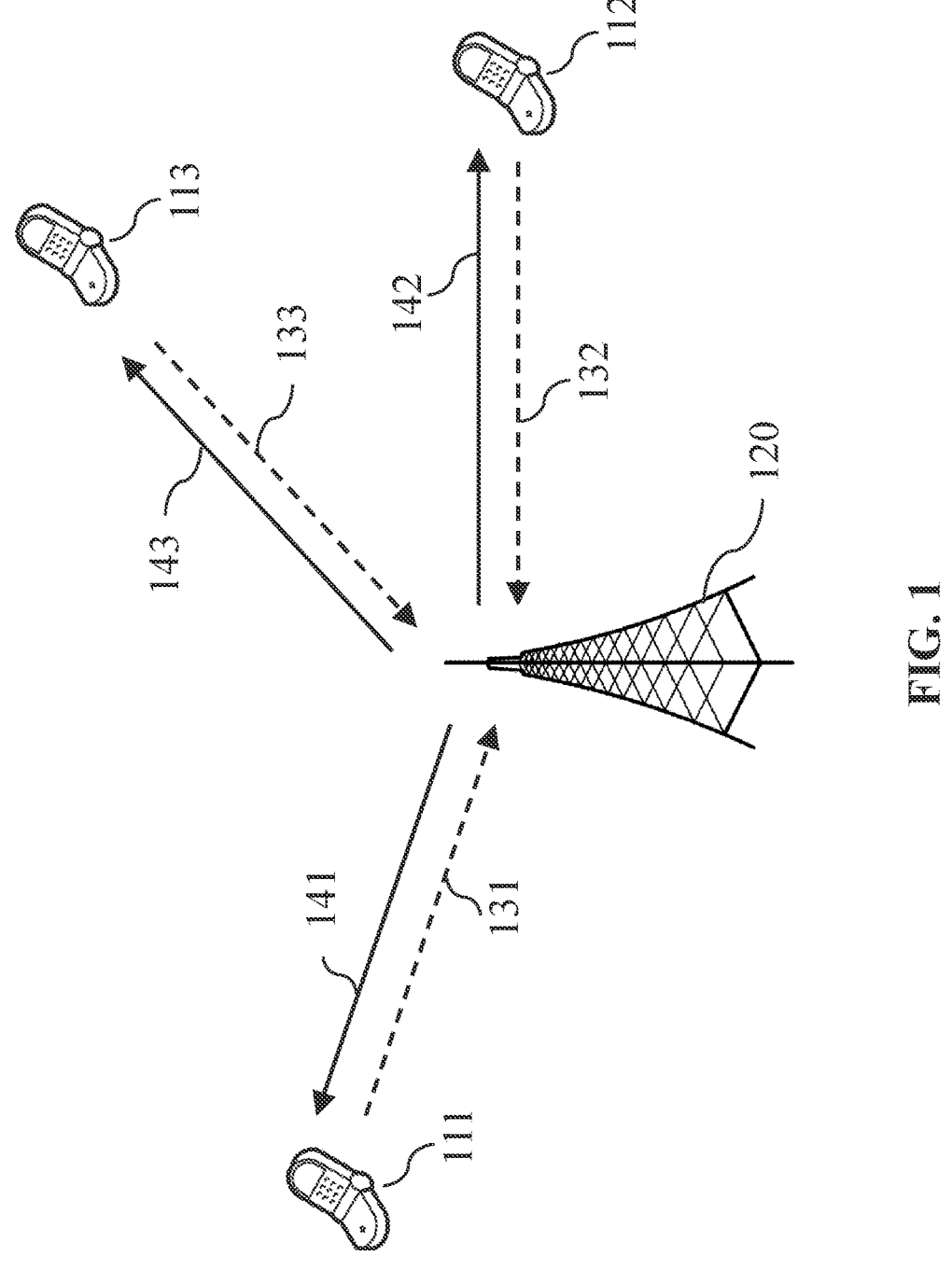
FIG. 1 shows an example of a base station (BS) and user equipment (UE) in wireless communication.

There is an increasing demand for fourth generation of mobile communication technology (4G, the 4th Generation mobile communication technology), Long-term evolution (LTE, Long-Term Evolution), Advanced long-term evolution (LTE-Advanced/LTE-A, Long-Term Evolution Advanced) and fifth-generation mobile communication technology (5G, the 5th Generation mobile communication technology). From the current development trend, 4G and 5G systems are studying the characteristics of supporting enhanced mobile broadband, ultra-high reliability, ultra-low latency transmission, and massive connectivity.

As fundamental building components to enable an NR system, the Physical Uplink Control Channel (PUCCH) and/or the Physical Shared Uplink Channel (PUSCH) are utilized to convey Uplink Control Information (UCI), which includes:

HARQ-ACK (Hybrid Automated Repeat Request-Acknowledgement) feedback in response to downlink data transmission.

Scheduling Request (SR) which is used to request resource for uplink data transmission.

Channel State Information (CSI) report which is used for link adaptation and downlink data scheduling. More specifically, CSI report may include Channel Quality Indicator (CQI), Pre-coding Matrix Indicator (PMI), Rank Indicator (RI), Layer Indicator (LI) and beam related information.

In LTE, PUCCH is transmitted in one or more Physical Resource Blocks (PRB) at the edges of the system bandwidth, following a mirrored pattern with slot level frequency hopping within a subframe so as to maximize the frequency diversity. In NR, more flexible PUCCH structures need to be considered towards targeting different applications and use cases, especially for the support of low latency application such as URLLC.

If a UE is not transmitting on the PUSCH, and the UE is transmitting UCI in a PUCCH using, for example, the following formats:

PUCCH format 0 if
the transmission is over 1 symbol or 2 symbols,
the number of HARQ-ACK information bits with positive or negative SR (HARQ-ACK/SR bits) is 1 or 2

PUCCH format 1 if
the transmission is over 4 or more symbols,
the number of HARQ-ACK/SR bits is 1 or 2

PUCCH format 2 if
the transmission is over 1 symbol or 2 symbols,
the number of UCI bits is more than 2

PUCCH format 3 if
the transmission is over 4 or more symbols,
the number of UCI bits is more than 2,
the PUCCH resource does not include an orthogonal cover code PUCCH format 4 if
the transmission is over 4 or more symbols,
the number of UCI bits is more than 2,
the PUCCH resource includes an orthogonal cover code In some embodiments, for PUCCH formats supporting more than 2 bits, two coding schemes are applied depending on the payload size of the UCI, e.g., a block code based on Reed-Muller Codes is applied when the input payload size is between 3 to 11 bits, and Polar codes are used when larger than 11 bits. Since block codes are not the optimal coding scheme at low code rates for small to medium payload, embodiments of the disclosed technology advantageously provide enhanced performance in these cases, especially in coverage enhancement scenarios.

FIG. 1 shows an example of a wireless communication system (e.g., an LTE, 5G or New Radio (NR) cellular network) that includes a BS 120 and one or more user equipment (UE) 111, 112 and 113. In some embodiments, the uplink transmissions (131, 132, 133) include cyclically-shifted base sequences that constitute the mapping scheme for the uplink control transmissions. The UE may be, for example, a smartphone, a tablet, a mobile computer, a machine to machine (M2M) device, a terminal, a mobile device, an Internet of Things (IoT) device, and so on.

The present document uses examples from the 3GPP New Radio (NR) network architecture and 5G protocol only to facilitate understanding and the disclosed techniques and embodiments may be practiced in other wireless systems that use different communication protocols than the 3GPP protocols.

Figure 2:
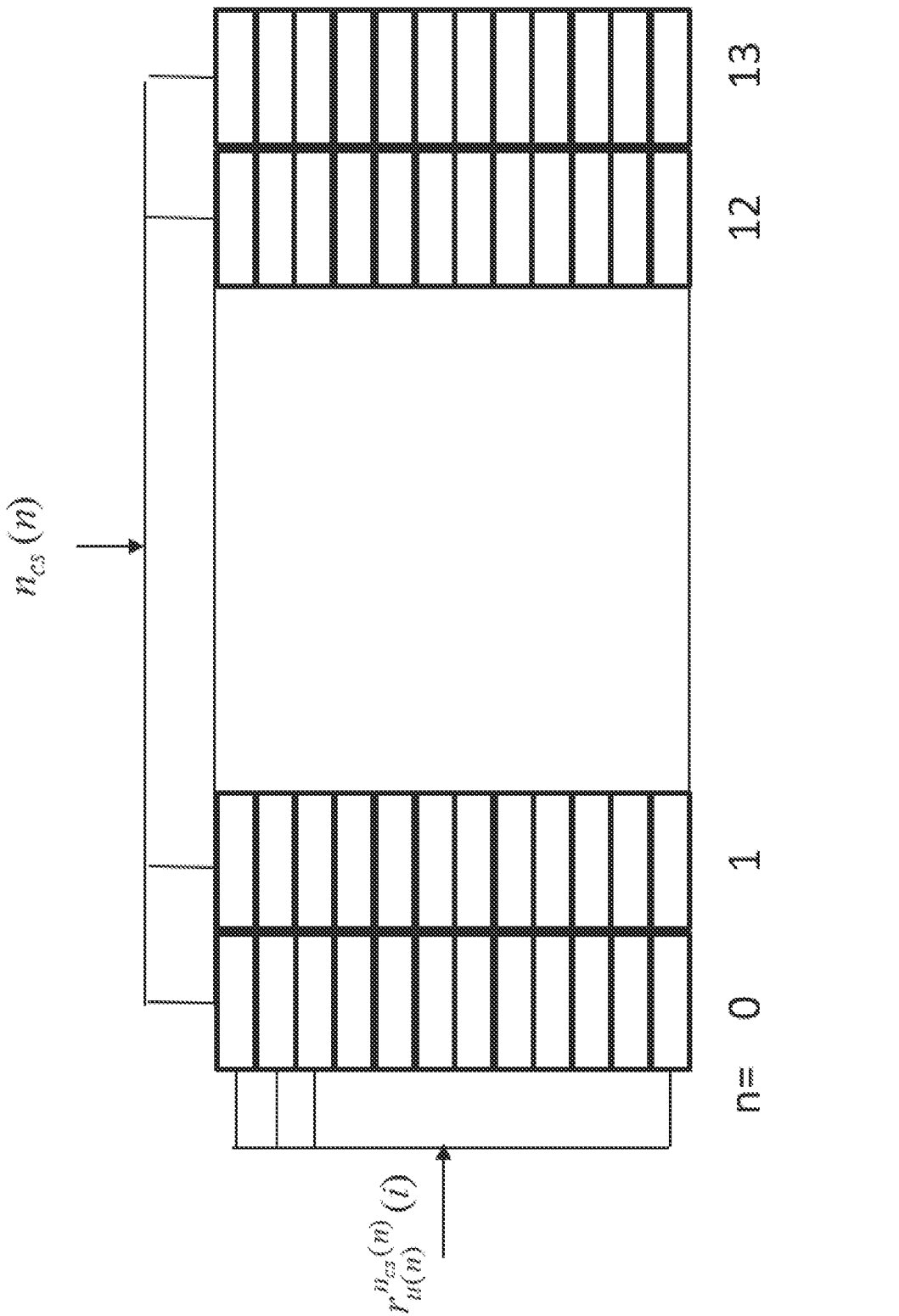
FIG. 2 shows an example of sequence generation for mapping schemes that use different cyclic shifts.

In some embodiments, a PUCCH format can be configured to occupy 1 resource block (RB) in the frequency-domain and 14 symbols in the time-domain, as shown in the example in FIG. 2. The short sequence used in the frequency-domain is a length-12 sequence. The short sequence is defined by a cyclic shift n of a base sequence $f_u(i)$ according to:

$$r_u^{ncs}(i) = e^{j\frac{2\pi i n_{cs}}{M_{ZC}}} \bar{r}_u(i), \ 0 \le i < M_{ZC} \tag{Eqn. 1}$$

Herein, $M_{ZC}$ is the length of the sequence and $M_{ZC}=12$ for 1 RB. Multiple sequences are defined from a single base sequence through different values of $n_{cs}$.

In some embodiments, the low-PAPR (peak-to-average-power ratio) sequences defined in current NR specification can be reused for the base sequence $\bar{r}_u(i)$, given by:

$$\bar{r}_u(i) = e^{j\varphi(i)\pi/4}, \ 0 \le i \le M_{ZC}-1 \tag{Eqn. 2}$$

In an example, the value of $\varphi(i)$ is given as shown in Table 1 below.

TABLE 1

| | Example definition of $\varphi(i)$ for $M_{ZC} = 12$ | | | | | | | | | | | |
|---|---|---|---|---|---|---|---|---|---|---|---|---|
| u | $\varphi(0), \ldots, \varphi(11)$ | | | | | | | | | | | |
| 0 | −3 | 1 | −3 | −3 | −3 | 3 | −3 | −1 | 1 | 1 | 1 | −3 |
| 1 | −3 | 3 | 1 | −3 | 1 | 3 | −1 | −1 | 1 | 3 | 3 | 3 |
| 2 | −3 | 3 | 3 | 1 | −3 | 3 | −1 | 1 | 3 | −3 | 3 | −3 |
| 3 | −3 | −3 | −1 | 3 | 3 | 3 | −3 | 3 | −3 | 1 | −1 | −3 |
| 4 | −3 | −1 | −1 | 1 | 3 | 1 | 1 | −1 | 1 | −1 | −3 | 1 |
| 5 | −3 | −3 | 3 | 1 | −3 | −3 | −3 | −1 | 3 | −1 | 1 | 3 |
| 6 | 1 | −1 | 3 | −1 | −1 | −1 | −3 | −1 | 1 | 1 | 1 | −3 |
| 7 | −1 | −3 | 3 | −1 | −3 | −3 | −3 | −1 | 1 | −1 | 1 | −3 |
| 8 | −3 | −1 | 3 | 1 | −3 | −1 | −3 | 3 | 1 | 3 | 3 | 1 |
| 9 | −3 | −1 | −1 | −3 | −3 | −1 | −3 | 3 | 1 | 3 | −1 | −3 |
| 10 | −3 | 3 | −3 | 3 | 3 | −3 | −1 | −1 | 3 | 3 | 1 | −3 |
| 11 | −3 | −1 | −3 | −1 | −1 | −3 | 3 | 3 | −1 | −1 | 1 | −3 |
| 12 | −3 | −1 | 3 | −3 | −3 | −1 | −3 | 1 | −1 | −3 | 3 | 3 |
| 13 | −3 | 1 | −1 | −1 | 3 | 3 | −3 | −1 | −1 | −3 | −1 | −3 |
| 14 | 1 | 3 | −3 | 1 | 3 | 3 | 3 | 1 | −1 | 1 | −1 | 3 |
| 15 | −3 | 1 | 3 | −1 | −1 | −3 | −3 | −1 | −1 | 3 | 1 | −3 |
| 16 | −1 | −1 | −1 | −1 | 1 | −3 | −1 | 3 | 3 | −1 | −3 | 1 |
| 17 | −1 | 1 | 1 | −1 | 1 | 3 | 3 | −1 | −1 | −3 | 1 | −3 |
| 18 | −3 | 1 | 3 | 3 | −1 | −1 | −3 | 3 | 3 | −3 | 3 | −3 |
| 19 | −3 | −3 | 3 | −3 | −1 | 3 | 3 | 3 | −1 | −3 | 1 | −3 |
| 20 | 3 | 1 | 3 | 1 | 3 | −3 | −1 | 1 | 3 | 1 | −1 | −3 |
| 21 | −3 | 3 | 1 | 3 | −3 | 1 | 1 | 1 | 1 | 3 | −3 | 3 |
| 22 | −3 | 3 | 3 | 3 | −1 | −3 | −3 | −1 | −3 | 1 | 3 | −3 |
| 23 | 3 | −1 | −3 | 3 | −3 | −1 | 3 | 3 | 3 | −3 | −1 | −3 |
| 24 | −3 | −1 | 1 | −3 | 1 | 3 | 3 | 3 | −1 | −3 | 3 | 3 |
| 25 | −3 | 3 | 1 | −1 | 3 | 3 | −3 | 1 | −1 | 1 | −1 | 1 |
| 26 | −1 | 1 | 3 | −3 | 1 | −1 | 1 | −1 | −1 | −3 | 1 | −1 |
| 27 | −3 | −3 | 3 | 3 | 3 | −3 | −1 | 1 | −3 | 3 | 1 | −3 |
| 28 | 1 | −1 | 3 | 1 | 1 | −1 | −1 | −1 | 1 | 3 | −3 | 1 |
| 29 | −3 | 3 | −3 | 3 | −3 | −3 | 3 | −1 | −1 | 1 | 3 | −3 |

In some embodiments, a combination set m {<u(n, m), $n_{cs}$(n, m)>, n=0, 1, 2, . . . , N−1} is used to represent one symbol (or bit) of information. Embodiments of the disclosed technology are configured for small to medium payload sizes, e.g., 3-11 bits, and thus, combinations based on cyclic shifts alone may be sufficient because $12^N >> 2^M$ when N=14 and M=11. Herein, u(n, m)=u(n', m), n, n'=0, 1, 2, . . . N−1, n≠n', and the combination set m can be simplified as {$n_{cs}$(n, m), n=0, 1, 2, . . . , N−1}. According to some embodiments, the information that is carried on the PUCCH has a one-to-one mapping to the combination set, regardless of whether the information is expressed as a bit sequence or converted to a decimal value.

In some embodiments, different cyclic shifts are used for different time domain symbols to represent different information. As shown in FIG. 1, a sequence $z(\cdot)$ to be mapped over the assigned resource for PUCCH transmission can be obtained according to:

$$z(nM_{ZC} + i) = r_u^{n_{cs}(n)}(i) \qquad \text{(Eqn. 3)}$$

$$i = 0, 1, \ldots, M_{ZC} - 1$$

$$n = 0, 1, \ldots, N - 1$$

Herein, N is the number of OFDM symbols used for the PUCCH format (with N=14 in this example). In some embodiments, the sequence $z(\cdot)$ can be mapped in a frequency-first time-second order over the assigned resource of the PUCCH. In other embodiments, it may be mapped in a time-first, frequency-second order over the assigned resource of the PUCCH.

In this manner, different uplink control information can be indicated by different combination sets (or equivalently, different CS hopping sequences $n_{cs}(n, m)$) to generate the sequence $z(\cdot)$ for the PUCCH transmission.

Some embodiments of the disclosed technology define a mapping between the uplink control information and a CS hopping sequence $n_{cs}(n, m)$ used for short sequences transmitted on each time-domain symbol for the PUCCH. Given that the payload of the uplink control information varies from 3 to 11 bits, different numbers of CS hopping sequences may be needed to support the varying payload size. With regard to notation, a length of the payload of the UCI is denoted as M bits, and the number of CS hopping sequences is assumed to be $N_{CSHop}=2^M$.

In some embodiments, the cyclic shift used for symbol index n for the UCI bits m (denoted by its decimal value) can be determined as:

$$n_{cs}(n,m)=M(T_{cs}(n,m))$$

$$T_{cs}(n,m)=\text{mod}(Y_n,B), n=0,1,\ldots,N-1$$

$$Y_n=\text{mod}(AY_{n-1},D)$$

$$Y_{-1}=m+C \qquad \text{(Eqn. 4)}$$

or $$n_{cs}(n,m)=M(T_{cs}(n,m))$$

$$T_{cs}(n,m)=\text{mod}(Y_{n+n'},B), n=0,1,\ldots,N-1$$

$$Y_n=\text{mod}(AY_{n-1},D)$$

$$Y_{-1}=m+C \qquad \text{(Eqn. 4')}$$

Herein, B is the number of cyclic shifts used for a base sequence, A and D are constants greater than zero, n' and C are constants greater than zero or functions based on the values of m and/or n, and $n_{cs}(n, m)=M(T_{cs}(n, m))$ denotes the mapping between $T_{cs}(n, m)$ and $n_{cs}$, wherein $M(\cdot)$ outputs the cyclic shift of its argument, which is used for the sequence generation.

In an example, $B=M_{ZC}=12$, which is equal to the length of the sequence of $z(\cdot)$. In this case, all the cyclic shifts available for the sequence are used, and the mapping between $T_{cs}(n, m)$ and $n_{cs}$ can be simplified as $n_{cs}=T_{cs}(n, m)$.

In another example, B=8, which is smaller than the length of the sequence of $z(\cdot)$. In this case, not all the cyclic shifts available for the sequence are used, and the mapping between $T_{cs}(n, m)$ and $n_{cs}$ can be predefined. As an example, the mapping between $T_{cs}(n, m)$ and $n_{cs}$ can be predefined as shown in Table 2.

TABLE 2

| Mapping between $T_{cs}(n, m)$ and $n_{cs}$ | |
|---|---|
| $T_{cs}(n,m)$ | $n_{cs}$ |
| 0 | 0 |
| 1 | 1 |
| 2 | 2 |
| 3 | 3 |
| 4 | 4 |
| 5 | 6 |
| 6 | 8 |
| 7 | 10 |

In some embodiments, A and D are selected from the prime numbers between 10,000 to 100,000, e.g., they can selected from Table 3. In other embodiments, a numerical search may be performed to determine allowable values of A and D.

In some embodiments, C is a UE-specific parameter. In an example, C may be related to the Cell Radio Network Temporary Identifier (C-RNTI) of the UE.

In some embodiments, the number of identical elements in the same location in any pair of CS hopping sequences within the CS hopping pattern (which refers to the set of CS hopping sequences) is denoted as K. The maximum value of K is also illustrated in Table 3 for different combinations of (A, D, m) assuming n'=0, K=1, B=12, and $n_{cs}=T_{cs}(n, m)$.

TABLE 3

| Maximum K for example values for A, D and m | | | | | | | | | | |
|---|---|---|---|---|---|---|---|---|---|---|
| | | m (in number of bits) | | | | | | | | |
| A | D | 3 | 4 | 5 | 6 | 7 | 8 | 9 | 10 | 11 |
| 39827 | 10289 | 3 | 3 | 4 | 4 | 5 | 5 | 6 | 6 | 6 |
| 39827 | 11311 | 2 | 5 | 5 | 5 | 5 | 5 | 6 | 6 | 6 |
| 39827 | 12373 | 3 | 5 | 5 | 5 | 5 | 5 | 6 | 6 | 6 |
| 39827 | 17851 | 3 | 4 | 4 | 4 | 5 | 5 | 6 | 6 | 6 |
| 39827 | 19051 | 2 | 4 | 5 | 5 | 5 | 5 | 6 | 6 | 6 |
| 39827 | 21727 | 3 | 3 | 5 | 5 | 5 | 5 | 6 | 6 | 6 |
| 39827 | 27077 | 3 | 4 | 4 | 5 | 5 | 5 | 6 | 6 | 6 |
| 39827 | 41813 | 2 | 4 | 4 | 5 | 5 | 5 | 6 | 6 | 6 |
| 39827 | 62039 | 2 | 3 | 4 | 5 | 5 | 5 | 6 | 6 | 6 |
| 39827 | 62273 | 3 | 3 | 4 | 5 | 5 | 5 | 6 | 6 | 6 |
| 39827 | 65537 | 5 | 5 | 6 | 6 | 6 | 6 | 6 | 6 | 6 |
| 39827 | 95329 | 3 | 3 | 5 | 5 | 5 | 5 | 6 | 6 | 6 |
| 10331 | 11311 | 3 | 3 | 5 | 5 | 5 | 5 | 6 | 6 | 6 |
| 12919 | 11311 | 3 | 4 | 5 | 5 | 5 | 5 | 6 | 6 | 6 |
| 17041 | 11311 | 3 | 4 | 4 | 4 | 5 | 5 | 6 | 6 | 6 |
| 22721 | 11311 | 2 | 3 | 4 | 5 | 5 | 5 | 6 | 6 | 6 |
| 25321 | 11311 | 2 | 3 | 4 | 4 | 5 | 5 | 6 | 6 | 6 |
| 26437 | 11311 | 2 | 3 | 4 | 5 | 5 | 5 | 6 | 6 | 6 |
| 45343 | 11311 | 2 | 3 | 4 | 5 | 5 | 5 | 6 | 6 | 6 |
| 47963 | 11311 | 2 | 3 | 4 | 4 | 5 | 5 | 6 | 6 | 6 |
| 55843 | 11311 | 2 | 3 | 4 | 5 | 5 | 5 | 6 | 6 | 6 |
| 65147 | 11311 | 2 | 3 | 4 | 4 | 5 | 5 | 6 | 6 | 6 |
| 65167 | 11311 | 2 | 3 | 4 | 4 | 5 | 5 | 6 | 6 | 6 |
| 90359 | 11311 | 2 | 4 | 4 | 5 | 5 | 5 | 5 | 6 | 6 |
| 93187 | 11311 | 2 | 3 | 4 | 4 | 5 | 5 | 6 | 6 | 6 |
| 11689 | 65537 | 3 | 4 | 4 | 4 | 5 | 5 | 6 | 6 | 6 |
| 12671 | 65537 | 3 | 3 | 4 | 5 | 5 | 5 | 6 | 6 | 6 |

7

TABLE 3-continued

Maximum K for example values for A, D and m

| A | D | 3 | 4 | 5 | 6 | 7 | 8 | 9 | 10 | 11 |
|---|---|---|---|---|---|---|---|---|----|----|
| | | | | | m (in number of bits) | | | | | |
| 23827 | 65537 | 3 | 3 | 4 | 5 | 5 | 5 | 6 | 6 | 6 |
| 50159 | 65537 | 2 | 4 | 4 | 4 | 5 | 5 | 6 | 6 | 6 |

In another example, Table 4 shows the cyclic shift sequences ($n_{cs}$) for the case with A=39827, D=62039, n'=0, K=1, B=12, and $n_{cs}=T_{cs}(n, m)$.

TABLE 4

Example cyclic shift sequences for A = 39827 and D = 62039

| m | | | | | | | $n_{cs}$ | | | | | | | |
|---|---|---|---|---|---|---|---|---|---|---|---|---|---|---|
| 0 | 11 | 11 | 0 | 6 | 6 | 11 | 11 | 6 | 4 | 4 | 6 | 5 | 6 | 2 |
| 1 | 5 | 5 | 7 | 0 | 7 | 10 | 10 | 7 | 3 | 8 | 0 | 5 | 0 | 4 |
| 2 | 4 | 11 | 2 | 6 | 8 | 9 | 4 | 1 | 2 | 0 | 1 | 5 | 6 | 1 |
| 3 | 10 | 5 | 9 | 0 | 2 | 8 | 3 | 2 | 1 | 11 | 7 | 5 | 0 | 3 |
| 4 | 4 | 11 | 9 | 6 | 3 | 7 | 9 | 3 | 0 | 3 | 8 | 5 | 6 | 0 |
| 5 | 3 | 5 | 4 | 0 | 4 | 6 | 8 | 9 | 11 | 7 | 2 | 5 | 0 | 2 |
| 6 | 9 | 11 | 11 | 6 | 10 | 5 | 2 | 10 | 10 | 11 | 3 | 5 | 6 | 11 |
| 7 | 8 | 5 | 6 | 7 | 11 | 11 | 1 | 4 | 9 | 10 | 9 | 5 | 0 | 1 |
| 8 | 2 | 11 | 6 | 1 | 0 | 10 | 7 | 5 | 8 | 2 | 10 | 10 | 6 | 10 |
| 9 | 8 | 5 | 1 | 7 | 6 | 9 | 6 | 6 | 7 | 6 | 4 | 10 | 0 | 0 |
| 10 | 7 | 11 | 8 | 1 | 7 | 8 | 0 | 0 | 6 | 10 | 10 | 10 | 6 | 9 |
| 11 | 1 | 5 | 3 | 7 | 8 | 7 | 11 | 1 | 5 | 9 | 11 | 10 | 0 | 11 |
| 12 | 0 | 11 | 3 | 1 | 9 | 6 | 5 | 7 | 4 | 1 | 5 | 10 | 6 | 1 |
| 13 | 6 | 5 | 10 | 7 | 3 | 5 | 4 | 8 | 3 | 5 | 6 | 10 | 0 | 10 |
| 14 | 0 | 11 | 5 | 8 | 4 | 4 | 3 | 9 | 2 | 9 | 0 | 10 | 6 | 0 |
| 15 | 11 | 5 | 0 | 2 | 5 | 10 | 9 | 3 | 1 | 8 | 1 | 10 | 0 | 9 |
| 16 | 5 | 11 | 0 | 8 | 11 | 9 | 8 | 4 | 0 | 0 | 7 | 10 | 6 | 11 |
| 17 | 4 | 5 | 7 | 2 | 0 | 8 | 2 | 10 | 11 | 4 | 8 | 3 | 0 | 8 |
| 18 | 10 | 11 | 2 | 8 | 1 | 7 | 1 | 11 | 10 | 8 | 2 | 3 | 6 | 10 |
| 19 | 4 | 5 | 9 | 2 | 7 | 6 | 7 | 0 | 9 | 7 | 8 | 3 | 0 | 7 |
| 20 | 3 | 11 | 4 | 8 | 8 | 5 | 6 | 6 | 8 | 11 | 9 | 3 | 6 | 9 |
| ... | | | | | | | ... | | | | | | | |
| 127 | 3 | 1 | 7 | 6 | 4 | 8 | 9 | 11 | 7 | 4 | 3 | 3 | 7 | 2 |
| ... | | | | | | | ... | | | | | | | |
| 255 | 1 | 9 | 9 | 0 | 3 | 4 | 6 | 5 | 2 | 8 | 6 | 6 | 9 | 4 |
| ... | | | | | | | ... | | | | | | | |
| 511 | 9 | 1 | 6 | 0 | 1 | 8 | 0 | 5 | 4 | 11 | 0 | 0 | 1 | 3 |
| ... | | | | | | | ... | | | | | | | |
| 1023 | 6 | 9 | 7 | 7 | 9 | 11 | 0 | 5 | 8 | 5 | 7 | 0 | 2 | 6 |
| ... | | | | | | | ... | | | | | | | |
| 2047 | 0 | 6 | 9 | 2 | 6 | 5 | 7 | 5 | 4 | 5 | 2 | 7 | 11 | 7 |

In yet another example, Table 5 shows the cyclic shift sequences ($n_{cs}$) for the case with A=39827, D=62039, n'=0, K=1, B=12, and $n_{cs}=T_{cs}(n, m)$.

TABLE 5

Example cyclic shift sequences for A = 39827 and D = 62039

| m | | | | | | | $n_{cs}$ | | | | | | | |
|---|---|---|---|---|---|---|---|---|---|---|---|---|---|---|
| 0 | 11 | 8 | 10 | 2 | 4 | 2 | 0 | 1 | 8 | 0 | 10 | 5 | 7 | 7 |
| 1 | 11 | 5 | 9 | 4 | 9 | 5 | 1 | 3 | 4 | 1 | 9 | 11 | 2 | 3 |
| 2 | 10 | 1 | 7 | 6 | 1 | 7 | 2 | 5 | 1 | 2 | 8 | 5 | 10 | 10 |
| 3 | 10 | 10 | 6 | 8 | 6 | 10 | 3 | 6 | 9 | 3 | 7 | 10 | 5 | 6 |
| 4 | 10 | 7 | 4 | 10 | 10 | 0 | 3 | 8 | 5 | 4 | 6 | 4 | 1 | 2 |
| 5 | 9 | 3 | 3 | 0 | 3 | 3 | 4 | 10 | 2 | 5 | 5 | 10 | 8 | 9 |
| 6 | 9 | 0 | 2 | 2 | 8 | 5 | 5 | 11 | 10 | 6 | 4 | 4 | 4 | 5 |
| 7 | 9 | 9 | 0 | 4 | 0 | 8 | 6 | 1 | 6 | 7 | 3 | 9 | 11 | 1 |
| 8 | 8 | 5 | 11 | 6 | 5 | 11 | 6 | 3 | 3 | 8 | 2 | 3 | 7 | 8 |
| 9 | 8 | 2 | 9 | 8 | 9 | 1 | 7 | 4 | 11 | 9 | 1 | 9 | 2 | 4 |
| 10 | 8 | 10 | 8 | 10 | 2 | 4 | 8 | 6 | 7 | 10 | 0 | 3 | 10 | 11 |
| 11 | 7 | 7 | 7 | 0 | 7 | 6 | 9 | 8 | 4 | 11 | 11 | 8 | 5 | 7 |
| 12 | 7 | 4 | 5 | 2 | 11 | 9 | 10 | 9 | 0 | 0 | 9 | 2 | 1 | 3 |
| 13 | 6 | 0 | 4 | 4 | 4 | 11 | 10 | 11 | 8 | 1 | 8 | 8 | 8 | 10 |
| 14 | 6 | 9 | 2 | 6 | 8 | 2 | 11 | 1 | 5 | 2 | 7 | 1 | 4 | 6 |

8

TABLE 5-continued

Example cyclic shift sequences for A = 39827 and D = 62039

| m | | | | | | | $n_{cs}$ | | | | | | | |
|---|---|---|---|---|---|---|---|---|---|---|---|---|---|---|
| 15 | 6 | 6 | 1 | 8 | 1 | 5 | 0 | 2 | 1 | 3 | 6 | 7 | 11 | 2 |
| 16 | 5 | 2 | 0 | 10 | 6 | 7 | 1 | 4 | 9 | 4 | 5 | 1 | 6 | 9 |
| 17 | 5 | 11 | 10 | 0 | 10 | 10 | 1 | 6 | 6 | 5 | 4 | 7 | 2 | 5 |
| 18 | 5 | 7 | 9 | 2 | 3 | 0 | 2 | 7 | 2 | 6 | 3 | 0 | 9 | 0 |
| 19 | 4 | 4 | 7 | 4 | 7 | 3 | 3 | 9 | 10 | 7 | 2 | 6 | 5 | 8 |
| 20 | 4 | 1 | 6 | 6 | 0 | 5 | 4 | 11 | 7 | 8 | 1 | 0 | 0 | 4 |
| ... | | | | | | | ... | | | | | | | |
| 127 | 2 | 0 | 0 | 9 | 0 | 4 | 3 | 11 | 10 | 3 | 5 | 1 | 7 | 4 |
| ... | | | | | | | ... | | | | | | | |
| 255 | 4 | 0 | 0 | 7 | 0 | 8 | 6 | 10 | 9 | 7 | 11 | 3 | 3 | 8 |
| ... | | | | | | | ... | | | | | | | |
| 511 | 8 | 0 | 1 | 2 | 0 | 4 | 1 | 8 | 7 | 2 | 10 | 7 | 7 | 5 |
| ... | | | | | | | ... | | | | | | | |
| 1023 | 5 | 0 | 3 | 4 | 1 | 8 | 3 | 5 | 2 | 5 | 8 | 2 | 3 | 10 |
| ... | | | | | | | ... | | | | | | | |
| 2047 | 11 | 4 | 7 | 7 | 10 | 2 | 6 | 8 | 8 | 10 | 5 | 11 | 0 | 0 |

In yet another example, Table 6 shows the cyclic shift sequences ($n_{cs}$) for the case with A=25321, D=11311, n'=0, K=1, B=12, and $n_{cs}=T_{cs}(n, m)$.

TABLE 6

Example cyclic shift sequences for A = 25321 and D = 11311

| m | | | | | | | $n_{cs}$ | | | | | | | |
|---|---|---|---|---|---|---|---|---|---|---|---|---|---|---|
| 0 | 11 | 5 | 10 | 5 | 9 | 9 | 11 | 3 | 11 | 3 | 4 | 7 | 3 | 8 |
| 1 | 10 | 10 | 1 | 3 | 6 | 6 | 10 | 11 | 10 | 6 | 1 | 2 | 6 | 4 |
| 2 | 9 | 3 | 11 | 1 | 8 | 3 | 2 | 7 | 9 | 9 | 5 | 2 | 9 | 0 |
| 3 | 8 | 8 | 2 | 11 | 5 | 5 | 1 | 10 | 8 | 0 | 2 | 9 | 0 | 8 |
| 4 | 0 | 1 | 5 | 9 | 7 | 2 | 5 | 6 | 7 | 3 | 11 | 4 | 3 | 9 |
| 5 | 11 | 6 | 3 | 7 | 4 | 11 | 4 | 2 | 6 | 6 | 3 | 4 | 6 | 5 |
| 6 | 10 | 11 | 6 | 5 | 1 | 1 | 3 | 10 | 5 | 9 | 0 | 11 | 9 | 1 |
| 7 | 9 | 4 | 9 | 3 | 3 | 10 | 7 | 1 | 4 | 0 | 4 | 6 | 5 | 9 |
| 8 | 1 | 9 | 7 | 8 | 0 | 7 | 6 | 9 | 3 | 3 | 1 | 6 | 8 | 10 |
| 9 | 0 | 2 | 10 | 6 | 2 | 4 | 10 | 5 | 7 | 11 | 10 | 1 | 11 | 6 |
| 10 | 11 | 7 | 1 | 4 | 11 | 6 | 9 | 8 | 6 | 2 | 2 | 1 | 2 | 2 |
| 11 | 10 | 0 | 11 | 2 | 8 | 3 | 8 | 4 | 5 | 5 | 11 | 8 | 5 | 10 |
| 12 | 2 | 5 | 2 | 0 | 10 | 0 | 0 | 0 | 4 | 8 | 3 | 3 | 8 | 11 |
| 13 | 1 | 10 | 0 | 10 | 7 | 2 | 11 | 8 | 3 | 11 | 0 | 3 | 11 | 7 |
| 14 | 0 | 3 | 3 | 8 | 9 | 11 | 3 | 11 | 2 | 2 | 9 | 10 | 7 | 3 |
| 15 | 11 | 8 | 6 | 6 | 6 | 8 | 2 | 7 | 1 | 5 | 1 | 5 | 10 | 11 |
| 16 | 3 | 1 | 4 | 4 | 3 | 5 | 1 | 3 | 0 | 8 | 10 | 5 | 1 | 7 |
| 17 | 2 | 6 | 7 | 9 | 5 | 7 | 5 | 6 | 11 | 11 | 2 | 0 | 4 | 8 |
| 18 | 1 | 11 | 10 | 7 | 2 | 4 | 4 | 2 | 3 | 2 | 11 | 0 | 7 | 4 |
| 19 | 0 | 4 | 8 | 5 | 4 | 1 | 8 | 10 | 2 | 10 | 8 | 7 | 10 | 0 |
| 20 | 4 | 9 | 11 | 3 | 1 | 3 | 7 | 6 | 1 | 1 | 0 | 2 | 1 | 8 |
| ... | | | | | | | ... | | | | | | | |
| 127 | 10 | 7 | 10 | 5 | 8 | 0 | 7 | 4 | 9 | 5 | 9 | 3 | 1 | 5 |
| ... | | | | | | | ... | | | | | | | |
| 255 | 1 | 7 | 8 | 10 | 9 | 5 | 7 | 8 | 11 | 10 | 6 | 6 | 2 | 3 |
| ... | | | | | | | ... | | | | | | | |
| 511 | 2 | 2 | 4 | 8 | 6 | 10 | 2 | 4 | 10 | 8 | 0 | 5 | 9 | 6 |
| ... | | | | | | | ... | | | | | | | |
| 1023 | 4 | 4 | 1 | 9 | 5 | 1 | 9 | 8 | 8 | 4 | 5 | 10 | 11 | 5 |
| ... | | | | | | | ... | | | | | | | |
| 2047 | 9 | 8 | 11 | 8 | 1 | 0 | 0 | 1 | 5 | 10 | 6 | 6 | 7 | 2 |

Table 3-5 shows examples of cyclic shift sequences wherein a cyclic shift for an n-th symbol is based on the cyclic shift for an (n−1)-th symbol, which advantageously ensures that if there is an identical value in the k-th position, then there will be a different value in the (k+1)-th position. This results in consistently avoiding the case with two consecutive positions being identical across two symbols.

In some embodiments, and for a PUCCH with N1 symbols (with N1<N), the CS hopping pattern can be truncated based on the basic pattern to meet the target length. In an example, the CS mapping on first N1 symbols of the N symbols are used.

In some embodiments, the CS hopping sequences described herein can be the initial CS hopping sequence for sequence generation. A cell-specific symbol-based CS hopping sequence can be applied on top of the initial CS hopping sequence.

In some embodiments, a PUCCH format can be configured to occupy 1 resource block (RB) in the frequency-domain and 14 symbols in the time-domain. The short sequence used in the frequency-domain is a length-12 sequence. The short sequence is defined by a cyclic shift $n_{cs}$ of a base sequence $\bar{r}_u$ (i) according to Equation 1. The low-PAPR sequences defined in current NR specification can be reused for the base sequence $\bar{r}_u(i)$, as defined in Equation 2, and wherein the value of φ(i) is as shown in Table 1.

In some embodiments, the cyclic shift used in symbol index n for the UCI bits m (denoted by a decimal value) can be expressed by:

$$n_{cs}(n, m) = \mathrm{mod}\left(\sum_{i=0}^{7} c(8 \cdot n + i) \cdot 2^i, B\right), n = 0, 1, 2, \ldots, N-1 \quad \text{(Eqn. 5)}$$

where c(k) is a binary sequence and defined as:

$$c(k) = \mathrm{mod}(x_1(k+N_c) + x_2(k+N_c), 2)$$

$$x_1(k+31) = \mathrm{mod}(x_1(k+3) + x_1(k), 2)$$

$$x_2(k+31) = \mathrm{mod}(x_2(k+3) + x_2(k+2) + x_2(k1) + x_2(k), 2) \quad \text{(Eqn. 6)}$$

where Nc is an integer and the first m-sequence $x_1(k)$ shall be initialized with $x_1(0)=1$, $x_1(1)=x_1(2)=\ldots=x_1(30)=0$. The initialization of the second m-sequence $x_2(k)$, is dependent on the UCI. For example, if the UCI bits are $[a_0, a_1, \ldots, a_{M-1}]$, then the initialization for $x_2(k)$ will be: $x_2(0)=a_0$, $x_2(1)=a_1$, $x_2(2)=a_2$, $\ldots$, $x_2(M-1)=a_{M-1}$, $x_2(M)=x_2(M+1)=\ldots=x_2(30)=0$.

In an example, $N_c$ is selected from Table 7, which also shows the maximum value of K for different combinations of $(N_c, m)$.

TABLE 7

Maximum K for example values of $N_c$ and m

| Nc | m (in number of bits) | | | | | | | | |
|---|---|---|---|---|---|---|---|---|---|
|  | 3 | 4 | 5 | 6 | 7 | 8 | 9 | 10 | 11 |
| 3447 | 2 | 4 | 4 | 6 | 6 | 6 | 6 | 7 | 7 |
| 3468 | 2 | 3 | 4 | 5 | 5 | 6 | 7 | 7 | 7 |
| 3470 | 2 | 4 | 5 | 6 | 7 | 7 | 7 | 7 | 7 |
| 3486 | 2 | 4 | 5 | 5 | 7 | 7 | 7 | 7 | 7 |
| 4564 | 2 | 4 | 4 | 5 | 6 | 7 | 7 | 7 | 7 |
| 6021 | 2 | 4 | 4 | 6 | 7 | 7 | 7 | 7 | 7 |
| 6021 | 2 | 4 | 4 | 6 | 7 | 7 | 7 | 7 | 7 |
| 6253 | 2 | 4 | 5 | 5 | 7 | 7 | 7 | 7 | 7 |
| 7166 | 2 | 4 | 5 | 6 | 6 | 7 | 7 | 7 | 7 |
| 7487 | 2 | 4 | 4 | 5 | 6 | 6 | 6 | 7 | 7 |
| 8427 | 2 | 4 | 5 | 5 | 6 | 7 | 7 | 7 | 7 |
| 8482 | 2 | 4 | 4 | 5 | 6 | 7 | 7 | 7 | 7 |
| 9611 | 2 | 4 | 5 | 5 | 6 | 7 | 7 | 7 | 7 |
| 9627 | 2 | 3 | 5 | 5 | 6 | 6 | 7 | 7 | 7 |

In an example, Table 8 shows the cyclic shift sequences ($n_{cs}$) for the case with $N_c$=7487 and B=12.

TABLE 8

Example cyclic shift sequences for $N_c$ = 7487 and B = 12

| m | $n_{cs}$ | | | | | | | | | | | | | |
|---|---|---|---|---|---|---|---|---|---|---|---|---|---|---|
| 0 | 8 | 11 | 3 | 0 | 8 | 6 | 9 | 7 | 6 | 1 | 0 | 10 | 4 | 6 |
| 1 | 7 | 8 | 1 | 9 | 10 | 8 | 3 | 1 | 11 | 0 | 5 | 5 | 1 | 8 |
| 2 | 9 | 0 | 0 | 2 | 3 | 3 | 4 | 0 | 10 | 3 | 6 | 1 | 0 | 3 |
| 3 | 6 | 3 | 10 | 7 | 9 | 1 | 10 | 10 | 3 | 2 | 7 | 2 | 9 | 5 |
| 4 | 6 | 10 | 4 | 5 | 5 | 0 | 5 | 2 | 8 | 10 | 11 | 9 | 2 | 6 |
| 5 | 1 | 5 | 10 | 0 | 11 | 2 | 11 | 0 | 9 | 11 | 6 | 6 | 7 | 0 |
| 6 | 11 | 1 | 3 | 11 | 2 | 9 | 0 | 9 | 0 | 4 | 1 | 10 | 10 | 7 |
| 7 | 4 | 10 | 5 | 2 | 0 | 7 | 6 | 7 | 1 | 5 | 8 | 5 | 3 | 1 |
| 8 | 9 | 7 | 8 | 10 | 2 | 5 | 1 | 5 | 11 | 0 | 11 | 9 | 1 | 0 |
| 9 | 6 | 0 | 10 | 11 | 0 | 11 | 11 | 11 | 10 | 9 | 2 | 2 | 8 | 6 |
| 10 | 0 | 0 | 7 | 4 | 5 | 8 | 8 | 10 | 11 | 6 | 9 | 2 | 5 | 1 |
| 11 | 11 | 11 | 9 | 5 | 11 | 6 | 6 | 4 | 10 | 3 | 8 | 5 | 0 | 3 |
| 12 | 3 | 2 | 11 | 3 | 3 | 7 | 1 | 8 | 1 | 7 | 8 | 10 | 11 | 4 |
| 13 | 8 | 1 | 1 | 10 | 9 | 9 | 11 | 10 | 8 | 10 | 5 | 1 | 2 | 2 |
| 14 | 2 | 9 | 0 | 1 | 8 | 10 | 8 | 7 | 1 | 5 | 6 | 9 | 3 | 9 |
| 15 | 9 | 10 | 2 | 4 | 10 | 4 | 6 | 5 | 8 | 8 | 3 | 10 | 6 | 11 |
| 16 | 8 | 7 | 6 | 11 | 5 | 11 | 1 | 8 | 0 | 11 | 5 | 11 | 6 | 3 |
| 17 | 7 | 0 | 4 | 10 | 7 | 5 | 11 | 6 | 5 | 6 | 4 | 8 | 3 | 1 |
| 18 | 9 | 0 | 5 | 1 | 6 | 10 | 4 | 7 | 4 | 1 | 7 | 4 | 2 | 10 |
| 19 | 6 | 11 | 11 | 8 | 0 | 4 | 2 | 9 | 9 | 0 | 2 | 7 | 11 | 0 |
| 20 | 10 | 6 | 1 | 2 | 4 | 5 | 9 | 5 | 2 | 4 | 6 | 0 | 0 | 7 |
| ... ... | | | | | | ... | | | | | | | | |
| 127 | 9 | 4 | 9 | 11 | 6 | 4 | 1 | 4 | 11 | 5 | 6 | 8 | 3 | 11 |
| ... | | | | | | | | | | | | | | |
| 255 | 11 | 9 | 6 | 6 | 3 | 5 | 5 | 10 | 9 | 6 | 4 | 6 | 6 | 0 |
| ... | | | | | | ... | | | | | | | | |
| 511 | 1 | 5 | 1 | 4 | 5 | 6 | 4 | 2 | 1 | 11 | 0 | 1 | 2 | 6 |
| ... | | | | | | ... | | | | | | | | |
| 2047 | 2 | 2 | 4 | 6 | 0 | 1 | 1 | 7 | 11 | 11 | 1 | 11 | 5 | 5 |

In an example, Table 9 shows the cyclic shift sequences ($n_{cs}$) for the case with $N_c$=3447 and B=12.

TABLE 9

Example cyclic shift sequences for $N_c$ = 3447 and B = 12

| m | $n_{cs}$ | | | | | | | | | | | | | |
|---|---|---|---|---|---|---|---|---|---|---|---|---|---|---|
| 0 | 3 | 1 | 0 | 11 | 3 | 5 | 1 | 0 | 9 | 9 | 10 | 1 | 8 | 1 |
| 1 | 1 | 4 | 3 | 3 | 5 | 9 | 2 | 1 | 8 | 0 | 9 | 10 | 2 | 2 |
| 2 | 4 | 9 | 11 | 9 | 10 | 1 | 8 | 10 | 5 | 5 | 5 | 4 | 9 | 2 |
| 3 | 2 | 4 | 4 | 1 | 0 | 5 | 7 | 3 | 4 | 8 | 6 | 3 | 3 | 1 |
| 4 | 4 | 1 | 3 | 2 | 7 | 3 | 9 | 9 | 3 | 7 | 7 | 11 | 4 | 8 |
| 5 | 10 | 8 | 0 | 6 | 9 | 3 | 2 | 8 | 10 | 10 | 4 | 4 | 10 | 3 |
| 6 | 11 | 5 | 8 | 0 | 2 | 7 | 0 | 11 | 3 | 7 | 8 | 2 | 1 | 7 |
| 7 | 1 | 8 | 7 | 4 | 4 | 7 | 3 | 2 | 6 | 10 | 11 | 9 | 7 | 0 |
| 8 | 8 | 9 | 9 | 3 | 7 | 8 | 9 | 0 | 6 | 0 | 4 | 4 | 8 | 7 |
| 9 | 2 | 4 | 10 | 11 | 9 | 8 | 10 | 1 | 7 | 5 | 3 | 3 | 6 | 8 |
| 10 | 3 | 1 | 10 | 1 | 2 | 8 | 4 | 10 | 10 | 0 | 3 | 9 | 5 | 4 |
| 11 | 1 | 4 | 1 | 9 | 4 | 8 | 11 | 3 | 11 | 5 | 8 | 6 | 3 | 11 |
| 12 | 7 | 9 | 10 | 6 | 11 | 10 | 9 | 1 | 4 | 6 | 9 | 2 | 8 | 10 |
| 13 | 1 | 0 | 9 | 2 | 1 | 6 | 6 | 0 | 1 | 11 | 2 | 9 | 6 | 9 |
| 14 | 8 | 5 | 9 | 4 | 6 | 6 | 0 | 3 | 8 | 2 | 2 | 7 | 9 | 9 |
| 15 | 6 | 0 | 2 | 0 | 8 | 2 | 3 | 6 | 1 | 7 | 5 | 0 | 7 | 2 |
| 16 | 2 | 5 | 2 | 9 | 3 | 11 | 11 | 8 | 6 | 5 | 3 | 9 | 2 | 8 |
| 17 | 0 | 0 | 9 | 9 | 9 | 9 | 11 | 8 | 1 | 7 | 8 | 4 | 6 | 8 | 11 |
| 18 | 1 | 9 | 1 | 11 | 10 | 3 | 6 | 10 | 10 | 1 | 8 | 0 | 7 | 7 |
| 19 | 7 | 0 | 6 | 11 | 4 | 3 | 1 | 11 | 11 | 4 | 3 | 11 | 1 | 4 |
| 20 | 5 | 5 | 9 | 0 | 7 | 5 | 11 | 5 | 0 | 7 | 10 | 7 | 6 | 5 |
| ... ... | | | | | | ... | | | | | | | | |
| 127 | 9 | 6 | 3 | 9 | 2 | 9 | 6 | 4 | 10 | 7 | 7 | 8 | 0 | 2 |
| ... | | | | | | | | | | | | | | |
| 255 | 10 | 9 | 10 | 4 | 7 | 11 | 9 | 11 | 5 | 1 | 9 | 0 | 2 | 9 |
| ... | | | | | | ... | | | | | | | | |
| 511 | 5 | 0 | 2 | 11 | 11 | 10 | 10 | 2 | 10 | 0 | 6 | 9 | 9 | 5 |
| ... | | | | | | ... | | | | | | | | |
| 2047 | 11 | 0 | 9 | 8 | 3 | 9 | 7 | 10 | 8 | 8 | 7 | 3 | 3 | 4 |

Tables 8 and 9 show examples wherein the cyclic shift depends on a pseudorandom sequence. In the example described, the pseudorandom sequence is a maximal length sequence (also referred to as an m-sequence), which is generated using maximal linear feedback shift register (LFSR).

Figure 3:
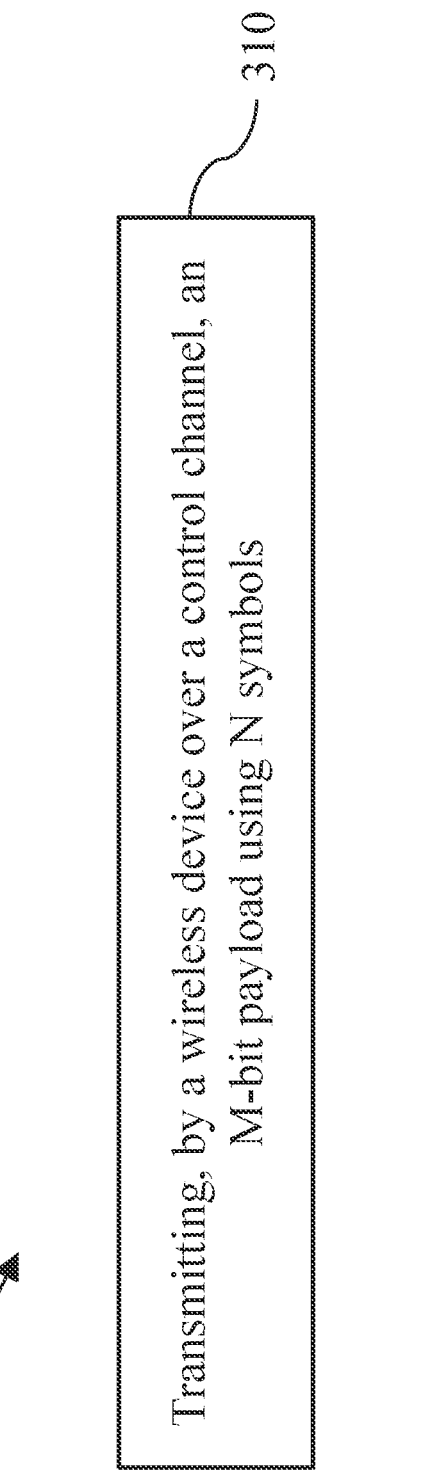
FIG. 3 shows an example of a wireless communication method.

FIG. 3 shows an example of a wireless communication method 300 for cyclic shift based mapping schemes for uplink control transmissions. The method 300 includes, at operation 310, transmitting, by a wireless device over a control channel, an M-bit payload using N symbols, wherein M and N are positive integers.

In some embodiments, each of the N symbols is represented using a base sequence (u(n, m)) and a cyclic shift ($n_{cs}$(n, m)) of the base sequence, n=0, 1, . . . (N−1) indexes a symbol in the N symbols, m=0, 1, . . . ($2^M$−1) indexes a combination set, m and n are non-negative integers, the cyclic shift for a j-th symbol is based on a cyclic shift for a (j−1)-th symbol, and j=1, 2, . . . (N−1) is a positive integer. In other embodiments, m is selected from the values 0, 1, . . . ($2^M$−1) and indexes a combination set.

In some embodiments, the cyclic shift ($n_{cs}$(n, m)) of the base sequence is determined as $n_{cs}$(n, m)=M($T_{cs}$(n, m)), $T_{cs}$(n, m)=mod($Y_{n+n'}$, B), $Y_n$=mod($AY_{n−1}$, D), $Y_{−1}$=m+C, wherein $Y_i$ is an i-th symbol, and wherein A, B, C, and D are positive integers.

In some embodiments, the cyclic shift ($n_{cs}$(n, m)) of the base sequence is determined as $n_{cs}$(n, m)=M($T_{cs}$(n, m)), $T_{cs}$(n, m)=mod($Y_{n+n'}$, B), $Y_n$=mod($AY_{n−1}$, D), $Y_{−1}$=m+C, wherein $Y_i$ is an i-th symbol, and wherein A, B, C, D, and n' are positive integers.

In some embodiments, B is a number of cyclic shifts used for the base sequence.

In some embodiments, B=12.

In some embodiments, C is a predetermined constant.

In some embodiments, C is a parameter specific to the wireless device.

In some embodiments, C is a function of a cell radio network temporary identifier (C-RNTI) associated with the wireless device.

In some embodiments, A and D are prime numbers.

In some embodiments, (A, D) is selected from the group consisting of (39827, 10289), (39827, 11311), (39827, 12373), (39827, 17851), (39827, 19051), (39827, 21727), (39827, 27077), (39827, 41813), (39827, 62039), (39827, 62273), (39827, 65537), (39827, 95329), (10331, 11311), (12919, 11311), (17041, 11311), (22721, 11311), (25321, 11311), (26437, 11311), (45343, 11311), (47963, 11311), (55843, 11311), (65147, 11311), (65167, 11311), (90359, 11311), (93187, 11311), (11689, 65537), (12671, 65537), (23827, 65537), and (50159, 65537).

In some embodiments, each of the N symbols is represented using a base sequence (u(n, m)) and a cyclic shift ($n_{cs}$(n, m)) of the base sequence, n=0, 1, . . . (N−1) indexes a symbol in the N symbols, m=0, 1, . . . ($2^M$−1) indexes a combination set, m and n are non-negative integers, and the cyclic shift for each of the N symbols is based on one or more pseudo-random binary sequences. In other embodiments, m is selected from the values 0, 1, . . . ($2^M$−1) and indexes a combination set.

In some embodiments, the cyclic shift ($n_{cs}$(n, m)) of the base sequence is determined as $$n_{cs}(n, m) = \mathrm{mod}\left(\sum_{i=0}^{7} c(8n + i) \times 2^i, B\right),$$

wherein the one or more pseudorandom binary sequences comprise c(k), $x_1$(k) and $x_2$(k), which are defined as c(k)= mod($x_1$(k+$N_c$)+$x_2$(k+$N_c$), 2), $x_1$(k+31)=mod($x_1$(k+3)+$x_1$(k), 2), $x_2$(k+31)=mod($x_2$(k+3)+$x_2$(k+2)+$x_2$(k+1)+$x_2$(k), 2), wherein $N_c$ is a positive integer.

In some embodiments, $x_1$(k) is initialized as $x_1$(0)=1, $x_1$(1)=$x_1$(2)= . . . =$x_1$(30)=0.

In some embodiments, $N_c$ is equal to 3447, 3468, 3470, 3486, 4564, 6021, 6021, 6253, 7166, 7487, 8427, 8482, 9611, or 9627.

In some embodiments, an initialization of $x_2$(k) is based on an uplink control information (UCI).

In some embodiments, the UCI comprises a bit sequence [$a_0$, $a_1$, . . . , $a_{m−1}$], and wherein $x_2$(k) is initialized as $x_2$(0)=$a_0$, $x_2$(1)=$a_1$, $x_2$(2)=$a_2$, . . . , $x_2$(M−1)=$a_{M−1}$, and $x_2$(M)=$x_2$(M+1)= . . . =$x_2$(30)=0.

Figure 4:
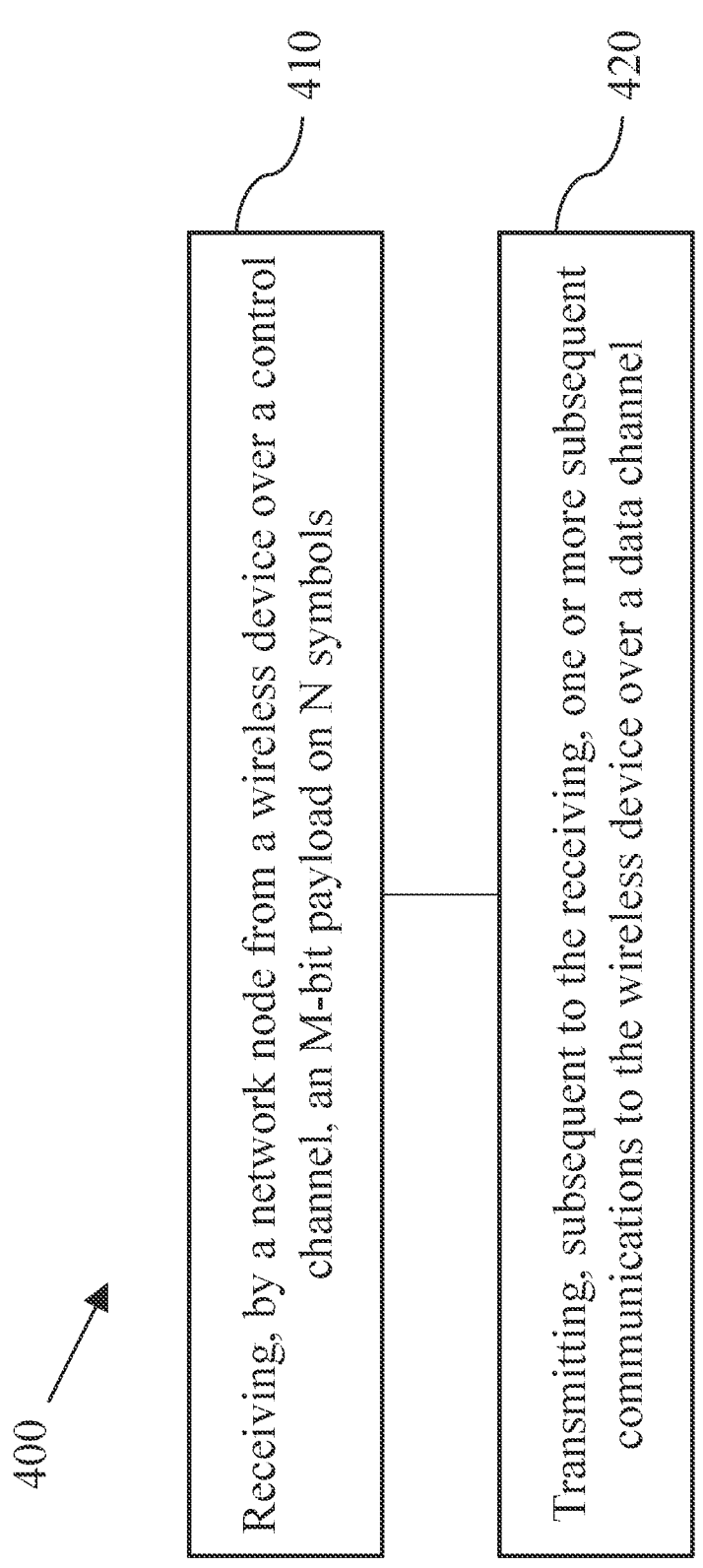
FIG. 4 shows an example of another wireless communication method.

FIG. 4 shows another example of a wireless communication method 400 for cyclic shift based mapping schemes for uplink control transmissions. The method 400 includes, at operation 410, receiving, by a network node from a wireless device over a control channel, an M-bit payload on N symbols, wherein M and N are positive integers.

The method 400 includes, at operation 420, transmitting, subsequent to the receiving, one or more subsequent communications to the wireless device over a data channel.

In some embodiments, each of the N symbols is represented using a base sequence (u(n, m)) and a cyclic shift ($n_{cs}$(n, m)) of the base sequence, n=0, 1, . . . (N−1) indexes a symbol in the N symbols, m=0, 1, . . . ($2^M$−1) indexes a combination set, m and n are non-negative integers, the cyclic shift for a j-th symbol is based on a cyclic shift for a (j−1)-th symbol, and j=1, 2, . . . (N−1) is a positive integer.

In some embodiments, each of the N symbols is represented using a base sequence (u(n, m)) and a cyclic shift ($n_{cs}$(n, m)) of the base sequence, n=0, 1, . . . (N−1) indexes a symbol in the N symbols, m=0, 1, . . . ($2^M$−1) indexes a combination set, m and n are non-negative integers, and the cyclic shift for each of the N symbols is based on one or more pseudorandom binary sequences.

In some embodiments, the $2^M$ combination sets are configured or predefined such that at most K elements are identical between any two combination sets of the $2^M$ combination sets, and wherein K is a non-negative integer.

In some embodiments, each of the at most K elements has an identical relative location in each of the any two combination sets.

In some embodiments, the transmitting is performed over a set of resources of the control channel, and wherein a mapping over the set of resources is in a frequency-first time-second order.

In some embodiments, the control channel is a PUCCH.

In some embodiments, the combination set comprises the base sequence and the cyclic shift used to represent a corresponding one of the N symbols.

In some embodiments, the N symbols are modulated using an orthogonal frequency division multiplexing (OFDM) modulation over the plurality of subcarriers.

In some embodiments, the N symbols are modulated using Discrete Fourier Transform spread orthogonal frequency division multiplexing (DFT-S-OFDM) modulation over the plurality of subcarriers.

Figure 5:
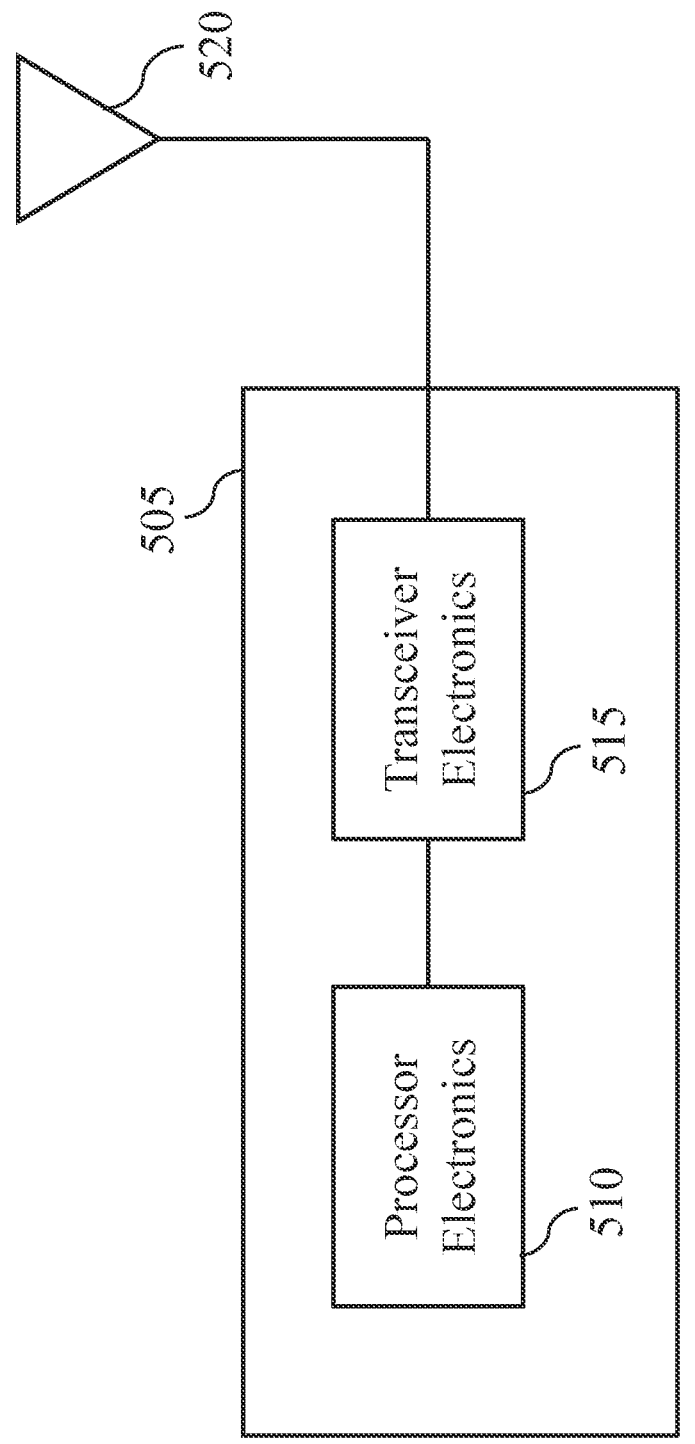
FIG. 5 is a block diagram representation of a portion of an apparatus that can be used to implement methods and/or techniques of the presently disclosed technology.

FIG. 5 is a block diagram representation of a portion of an apparatus, in accordance with some embodiments of the presently disclosed technology. An apparatus 505, such as a base station or a wireless device (or UE), can include processor electronics 510 such as a microprocessor that implements one or more of the techniques presented in this document. The apparatus 505 can include transceiver electronics 515 to send and/or receive wireless signals over one or more communication interfaces such as antenna(s) 520.

The apparatus 505 can include other communication interfaces for transmitting and receiving data. Apparatus 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the apparatus 505.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:

transmitting, by a wireless device over a control channel, an M-bit payload using N symbols, wherein M and N are positive integers, wherein each of the N symbols is represented using a base sequence (u(n, m)) and a cyclic shift ($n_{cs}$(n, m)) of the base sequence, wherein n=0, 1, . . . (N−1) indexes a symbol in the N symbols, wherein m=0, 1, . . . ($2^M$−1) indexes a combination set m {<u(n, m), $n_{cs}$(n, m)>} of the base sequence and the cyclic shift, wherein m and n are non-negative integers, wherein the $2^M$ combination sets are configured or predefined such that at most K elements are identical between any two combination sets of the $2^M$ combination sets, wherein each of the at most K elements has an identical relative location in each of the any two combination sets, wherein K is a non-negative integer, and:

wherein the cyclic shift for a j-th symbol is based on a cyclic shift for a (j−1)-th symbol, wherein j=1, 2, . . . (N−1) is a positive integer, and wherein the cyclic shift $n_{cs}$(n, m) of the base sequence is determined as:

$$n_{cs}(n,m)=M(T_{cs}(n,m)), \text{ wherein } M(\bullet) \text{ outputs the cyclic shift of } its \text{ argument,}$$

$$T_{cs}(n,m)=\text{mod}(Y_n,B), \text{ or } \text{mod}(Y_{n+n'},B),$$

$$Y_n=\text{mod}(AY_{n-1},D),$$

$$Y_{-1}=m+C,$$

wherein $Y_i$ is an i-th symbol, and wherein A, B, C, D, and n' are positive integers.

2. The method of claim 1, wherein B is a number of cyclic shifts used for the base sequence.

3. The method of claim 1, wherein C is a parameter specific to the wireless device, and wherein C is a function of a cell radio network temporary identifier (C-RNTI) associated with the wireless device.

4. The method of claim 1, wherein A and D are prime numbers, and wherein (A, D) is selected from the group consisting of (39827, 10289), (39827, 11311), (39827, 12373), (39827, 17851), (39827, 19051), (39827, 21727), (39827, 27077), (39827, 41813), (39827, 62039), (39827, 62273), (39827, 65537), (39827, 95329), (10331, 11311), (12919, 11311), (17041, 11311), (22721, 11311), (25321, 11311), (26437, 11311), (45343, 11311), (47963, 11311), (55843, 11311), (65147, 11311), (65167, 11311), (90359, 11311), (93187, 11311), (11689, 65537), (12671, 65537), (23827, 65537), and (50159, 65537).

5. The method of claim 1, wherein the N symbols are modulated using Discrete Fourier Transform spread orthogonal frequency division multiplexing (DFT-S-OFDM) modulation over a plurality of subcarriers.

6. A method for wireless communication, comprising:

receiving, by a network node from a wireless device over a control channel, an M-bit payload on N symbols, wherein M and N are positive integers; and transmitting, subsequent to the receiving, one or more subsequent communications to the wireless device over a data channel, wherein each of the N symbols is represented using a base sequence (u(n, m)) and a cyclic shift ($n_{cs}$(n, m)) of the base sequence, wherein n=0, 1, . . . (N−1) indexes a symbol in the N symbols, wherein m=0, 1, . . . ($2^M$−1) indexes a combination set m {<u(n, m), $n_{cs}$(n, m)>} of the base sequence and the cyclic shift, wherein m and n are non-negative integers, wherein the $2^M$ combination sets are configured or pre-defined such that at most K elements are identical between any two combination sets of the $2^M$ combination sets, wherein each of the at most K elements has an identical relative location in each of the any two combination sets, wherein K is a non-negative integer, and:

wherein the cyclic shift for a j-th symbol is based on a cyclic shift for a (j−1)-th symbol, wherein j=1, 2, . . . (N−1) is a positive integer, and wherein the cyclic shift $n_{cs}$(n, m) of the base sequence is determined as:

$$n_{cs}(n,m)=M(T_{cs}(n,m)), \text{ wherein } M(\bullet) \text{ outputs the}$$
$$\text{cyclic shift of } its \text{ argument,}$$

$$T_{cs}(n,m)=\text{mod}(Y_n,B), \text{ or } \text{mod}(Y_{n+n'},B),$$

$$Y_n=\text{mod}(AY_{n-1},D),$$

$$Y_{-1}=m+C,$$

wherein $Y_i$ is an i-th symbol, and wherein A, B, C, D, and n' are positive integers.

7. The method of claim 6, wherein B is a number of cyclic shifts used for the base sequence.

8. The method of claim 6, wherein C is a parameter specific to the wireless device, and wherein C is a function of a cell radio network temporary identifier (C-RNTI) associated with the wireless device.

9. The method of claim 6, wherein A and D are prime numbers, and wherein (A, D) is selected from the group consisting of (39827, 10289), (39827, 11311), (39827, 12373), (39827, 17851), (39827, 19051), (39827, 21727), (39827, 27077), (39827, 41813), (39827, 62039), (39827, 62273), (39827, 65537), (39827, 95329), (10331, 11311), (12919, 11311), (17041, 11311), (22721, 11311), (25321, 11311), (26437, 11311), (45343, 11311), (47963, 11311), (55843, 11311), (65147, 11311), (65167, 11311), (90359, 11311), (93187, 11311), (11689, 65537), (12671, 65537), (23827, 65537), and (50159, 65537).

10. The method of claim 6, wherein the N symbols are modulated using Discrete Fourier Transform spread orthogonal frequency division multiplexing (DFT-S-OFDM) modulation over a plurality of subcarriers.

11. An apparatus for wireless communication comprising processor electronics and a memory storing instructions, execution of which by the processor electronics causes the apparatus to perform operations comprising:

transmitting, over a control channel, an M-bit payload using N symbols, wherein M and N are positive integers, wherein each of the N symbols is represented using a base sequence (u(n, m)) and a cyclic shift ($n_{cs}$(n, m)) of the base sequence, wherein n=0, 1, . . . (N−1) indexes a symbol in the N symbols, wherein m=0, 1, . . . ($2^M$−1) indexes a combination set m {<u(n, m), $n_{cs}$(n, m)>} of the base sequence and the cyclic shift, wherein m and n are non-negative integers, wherein the $2^M$ combination sets are configured or pre-defined such that at most K elements are identical between any two combination sets of the $2^M$ combination sets, wherein each of the at most K elements has an identical relative location in each of the any two combination sets, wherein K is a non-negative integer, and:

wherein the cyclic shift for a j-th symbol is based on a cyclic shift for a (j−1)-th symbol, wherein j=1, 2, . . . (N−1) is a positive integer, and wherein the cyclic shift $n_{cs}$(n, m) of the base sequence is determined as:

$$n_{cs}(n,m)=M(T_{cs}(n,m)), \text{ wherein } M(\bullet) \text{ outputs the}$$
$$\text{cyclic shift of } its \text{ argument,}$$

$$T_{cs}(n,m)=\text{mod}(Y_n,B), \text{ or } \text{mod}(Y_{n+n'},B),$$

$$Y_n=\text{mod}(AY_{n-1},D),$$

$$Y_{-1}=m+C,$$

wherein $Y_i$ is an i-th symbol, and wherein A, B, C, D, and n' are positive integers.

12. The apparatus of claim 11, wherein B is a number of cyclic shifts used for the base sequence.

13. The apparatus of claim 11, wherein C is a parameter specific to the wireless device, and wherein C is a function of a cell radio network temporary identifier (C-RNTI) associated with the wireless device.

14. The apparatus of claim 11, wherein A and D are prime numbers, and wherein (A, D) is selected from the group consisting of (39827, 10289), (39827, 11311), (39827, 12373), (39827, 17851), (39827, 19051), (39827, 21727), (39827, 27077), (39827, 41813), (39827, 62039), (39827, 62273), (39827, 65537), (39827, 95329), (10331, 11311), (12919, 11311), (17041, 11311), (22721, 11311), (25321, 11311), (26437, 11311), (45343, 11311), (47963, 11311), (55843, 11311), (65147, 11311), (65167, 11311), (90359, 11311), (93187, 11311), (11689, 65537), (12671, 65537), (23827, 65537), and (50159, 65537).

15. The apparatus of claim 11, wherein the N symbols are modulated using Discrete Fourier Transform spread orthogonal frequency division multiplexing (DFT-S-OFDM) modulation over a plurality of subcarriers.

16. An apparatus for wireless communication comprising a processor electronics and a memory storing instructions, execution of which by the processor electronics causes the apparatus to perform operations comprising:

receiving, from a wireless device over a control channel, an M-bit payload on N symbols, wherein M and N are positive integers; and transmitting, subsequent to the receiving, one or more subsequent communications to the wireless device over a data channel, wherein each of the N symbols is represented using a base sequence ($u(n, m)$) and a cyclic shift ($n_{cs}(n, m)$) of the base sequence, wherein $n=0, 1, \ldots (N-1)$ indexes a symbol in the N symbols, wherein $m=0, 1, \ldots (2^M-1)$ indexes a combination set m $\{<u(n, m), n_{cs}(n, m)>\}$ of the base sequence and the cyclic shift, wherein m and n are non-negative integers, wherein the $2^M$ combination sets are configured or predefined such that at most K elements are identical between any two combination sets of the $2^M$ combination sets, wherein each of the at most K elements has an identical relative location in each of the any two combination sets, wherein K is a non-negative integer, and:

wherein the cyclic shift for a j-th symbol is based on a cyclic shift for a (j−1)-th symbol, wherein $j=1, 2, \ldots (N-1)$ is a positive integer, and wherein the cyclic shift $n_{cs}(n, m)$ of the base sequence is determined as:

$n_{cs}(n,m)=M(T_{cs}(n,m))$, wherein $M(\bullet)$ outputs the cyclic shift of *its* argument, $T_{cs}(n,m)=\mod(Y_n,B)$, or $\mod(Y_{n+n'},B)$, $Y_n=\mod(AY_{n-1},D)$, $Y_{-1}=m+C$, wherein $Y_i$ is an i-th symbol, and wherein A, B, C, D, and n' are positive integers.

17. The apparatus of claim 16, wherein B is a number of cyclic shifts used for the base sequence.

18. The apparatus of claim 16, wherein C is a parameter specific to the wireless device, and wherein C is a function of a cell radio network temporary identifier (C-RNTI) associated with the wireless device.

19. The method of claim 16, wherein A and D are prime numbers, and wherein (A, D) is selected from the group consisting of (39827, 10289), (39827, 11311), (39827, 12373), (39827, 17851), (39827, 19051), (39827, 21727), (39827, 27077), (39827, 41813), (39827, 62039), (39827, 62273), (39827, 65537), (39827, 95329), (10331, 11311), (12919, 11311), (17041, 11311), (22721, 11311), (25321, 11311), (26437, 11311), (45343, 11311), (47963, 11311), (55843, 11311), (65147, 11311), (65167, 11311), (90359, 11311), (93187, 11311), (11689, 65537), (12671, 65537), (23827, 65537), and (50159, 65537).

20. The apparatus of claim 16, wherein the N symbols are modulated using Discrete Fourier Transform spread orthogonal frequency division multiplexing (DFT-S-OFDM) modulation over a plurality of subcarriers.

* * * * *